United States Patent
Orlowski et al.

(10) Patent No.: US 12,202,519 B2
(45) Date of Patent: Jan. 21, 2025

(54) METHODS AND SYSTEMS FOR DETERMINING A MANEUVER TO BE EXECUTED BY AN AUTONOMOUS VEHICLE

(71) Applicant: Aptiv Technologies AG, Schaffhausen (CH)

(72) Inventors: Mateusz Orlowski, Cracow (PL); Tomasz Wrona, Cracow (PL); Wojciech Turlej, Cracow (PL); Nikodem Pankiewicz, Cracow (PL)

(73) Assignee: APTIV TECHNOLOGIES AG, Schaffhausen (CH)

( * ) Notice: Subject to any disclaimer, the term of this patent is extended or adjusted under 35 U.S.C. 154(b) by 359 days.

(21) Appl. No.: 17/518,400

(22) Filed: Nov. 3, 2021

(65) Prior Publication Data

US 2022/0153303 A1    May 19, 2022

(30) Foreign Application Priority Data

Nov. 16, 2020    (EP) .................................... 20207784

(51) Int. Cl.
- *G06F 9/30*    (2018.01)
- *B60W 30/095*  (2012.01)
- *B60W 60/00*   (2020.01)
- *G06N 3/063*   (2023.01)

(52) U.S. Cl.
CPC ...... *B60W 60/0015* (2020.02); *B60W 30/095* (2013.01); *G06F 9/3001* (2013.01); *G06N 3/063* (2013.01); *B60W 2552/53* (2020.02)

(58) Field of Classification Search
CPC ..... B60W 2050/0075; B60W 2520/10; B60W 2552/53; B60W 2556/10; B60W 30/095; B60W 60/0011; B60W 60/0015; G06N 3/063; G06F 9/3001
See application file for complete search history.

(56) References Cited

U.S. PATENT DOCUMENTS

| | | | |
|---|---|---|---|
| 2018/0173571 A1* | 6/2018 | Huang | G06N 3/063 |
| 2018/0322381 A1* | 11/2018 | Liu | G06N 3/04 |
| 2019/0113918 A1* | 4/2019 | England | G06N 5/046 |
| 2020/0097799 A1* | 3/2020 | Divakar | G06N 3/08 |
| 2020/0139973 A1 | 5/2020 | Palanisamy et al. | |

(Continued)

OTHER PUBLICATIONS

"Extended European Search Report", EP Application No. 20207784.8, May 3, 2021, 9 pages.

(Continued)

*Primary Examiner* — Matthew J. Reda
(74) *Attorney, Agent, or Firm* — Harness, Dickey & Pierce, P.L.C.

(57) ABSTRACT

A computer implemented method for determining a maneuver to be executed by an autonomous vehicle comprises the following steps carried out by computer hardware components: determining a plurality of potential maneuvers; determining a subset of the potential maneuvers based on a pre-determined condition; determining a mask based on the subset; determining an output of a fully connected layer of a neural network; determining a dot product of the output of the fully connected layer and the mask; and determining the maneuver to be executed based on the dot product.

16 Claims, 4 Drawing Sheets

(56) References Cited

U.S. PATENT DOCUMENTS

2020/0410254 A1\* 12/2020 Pham ..................... G06T 11/60
2021/0089903 A1\* 3/2021 Murray ............... G06F 18/2132
2021/0374502 A1\* 12/2021 Roth ........................ G06N 3/08

OTHER PUBLICATIONS

"OpenAI Five", Retrieved at: https://openai.com/blog/openai-five/, Jun. 25, 2018, 16 pages.
Matiisen, "The Use of Embeddings in Openai Five", https://neuro.cs.ut.ee/the-use-of-embeddings-in-openai-five/, Sep. 9, 2018, 8 pages.
Nister, et al., "The Safety Force Field", Mar. 2019, 24 pages.
Shalev-Shwart, et al., "On a Formal Model of Safe and Scalable Self-Driving Cars", Oct. 27, 2018, 37 pages.
Vaswani, et al., "Attention Is All You Need", Dec. 6, 2017, 15 pages.
Wen, et al., "A deep learning framework for road marking extraction, classification and completion from mobile laser scanning point clouds", Jan. 2019, pp. 178-192.

\* cited by examiner

METHODS AND SYSTEMS FOR DETERMINING A MANEUVER TO BE EXECUTED BY AN AUTONOMOUS VEHICLE

CROSS-REFERENCE TO RELATED APPLICATION

This application claims priority to European Patent Application Number 20207784.8, filed Nov. 16, 2020, the disclosure of which is hereby incorporated by reference in its entirety herein.

BACKGROUND

Vehicles which are capable of (at least partially) driving autonomously may take decisions which could compromise safety of the own vehicle or other vehicles (or their occupants).

Accordingly, there is a need to improve safety of such vehicles.

SUMMARY

The present disclosure relates to methods and systems for determining a maneuver to be executed by an autonomous vehicle. The present disclosure provides a computer implemented method, a computer system, a vehicle, and a non-transitory computer readable medium according to the independent claims. Embodiments are given in the subclaims, the description and the drawings.

In one aspect, the present disclosure is directed at a computer implemented method for determining a maneuver to be executed by an autonomous vehicle, the method comprising the following steps performed (in other words: carried out) by computer hardware components: determining a plurality of potential maneuvers; determining a subset of the potential maneuvers based on a pre-determined condition; determining a mask based on the subset; determining an output of a fully connected layer of a neural network; determining a dot product of the output of the fully connected layer and the mask; and determining the maneuver to be executed based on the dot product.

Machine Learning techniques (for example Reinforcement Learning, RL), involving (artificial) neural networks may be used in control tasks with safety guarantees defined outside of a data-driven approach. While the RL-based planning module is no longer responsible for safety, objectives of optimization during training may concern only efficiency, comfort and reaching predefined goals which may yield useful policy. The agent, while interacting with the environment, may be able to understand in a much more transparent way the relation between its actions and effect of them, since being limited only to acceptable actions. This may result in much shorter convergence time during training. Transparency may be improved because the agent action space is predefined and not silently filtered out after execution of a planning block.

The agent, which may be limited or bounded in its action, may try only possible and meaningful actions during training, which may result in better exploration and shortens training time. The method may provide a safety guaranteed usage of machine learning (for example RL) techniques in AD (autonomous driving) planning modules.

The method provides a combination of safety constrains introduced by safety frameworks with a specific neural network architecture allowing to limit the action space upfront. The safety framework may be used to define what kinds of actions (or maneuvers) are legal, safe and possible to execute by RL-based planning agent. While utilizing the neural network architecture, it may be assured that only those available actions are to be considered by the agent when making a decision. This mechanism guarantees safety (in terms of the safety framework) outside of the machine learning block in a deterministic manner and brings transparency with regards to effects of the actions.

According to another aspect, the pre-determined condition comprises at least one of lanes availability, legality of lane changes, objects appearance, or time constrains. The time constrains may include indicator timing and/or state-machine based requirements.

According to another aspect, the mask comprises a value of "1" for safe actions and a value of "0" for non-safe actions. This indication may be given for every possible maneuver. Thus, by taking a dot product between the possible maneuver and the mask, the unsafe actions may be filtered out (wherein only safe actions pass the filter).

According to another aspect, the dot product is followed (for example directly followed, i.e. followed without any further intermediate processing) by a softmax activation function.

According to another aspect, the softmax activation function is followed (for example directly followed, i.e. followed without any further intermediate processing) by sampling.

According to another aspect, the softmax activation function is followed (for example directly followed, i.e. followed without any further intermediate processing) by an argmax function.

According to another aspect, the neural network is used in a reinforcement learning method.

According to another aspect, the subset of the potential maneuvers are possible, safe, and legal maneuvers. According to another aspect, it is determined whether a potential maneuvers is possible, safe and legal based on at least one of available maneuvers, available distances, current speed, possible lane biases, and/or possible velocities. The available distances may be based on the current speed.

Then, a probability distribution may be defined over only available (in other words: possible, safe, and legal) actions.

According to another aspect, the potential maneuvers comprise all maneuvers which the vehicle is able to perform (i.e. irrespective of whether they are safe or not).

According to another aspect, at least one of a lane bias, a distance to another vehicle (for example a vehicle in front of the autonomous vehicle), or a velocity set point is determined for the potential maneuvers.

In another aspect, the present disclosure is directed at a computer system, said computer system comprising a plurality of computer hardware components configured to carry out several or all steps of the computer implemented method described herein.

The computer system may comprise a plurality of computer hardware components (for example a processor, for example processing unit or processing network, at least one memory, for example memory unit or memory network, and at least one non-transitory data storage). It will be understood that further computer hardware components may be provided and used for carrying out steps of the computer implemented method in the computer system. The non-transitory data storage and/or the memory unit may comprise a computer program for instructing the computer to perform several or all steps or aspects of the computer implemented method described herein, for example using the processing unit and the at least one memory unit.

In another aspect, the present disclosure is directed at a vehicle comprising the computer system described herein.

According to another aspect, the vehicle further comprises at least one sensor, wherein the subset of the potential maneuvers is determined based on an output of the at least one sensor. For example, based on the output of the at least one sensor, it may be determined whether a lane is occupied or available.

According to another aspect, the vehicle further comprises a map storage configured to store a map of a vicinity of the vehicle, wherein the subset of the potential maneuvers is determined based on the map. For example, based on the map, the road ahead and the need to change lanes may be determined.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

BRIEF DESCRIPTION OF THE DRAWINGS

Exemplary embodiments and functions of the present disclosure are described herein in conjunction with the following drawings, showing schematically.

DETAILED DESCRIPTION

As autonomous driving moves forward to real world application, more and more attention is paid to the planning part of the system, and more complex driving policies need to be employed to allow negotiation, adaptation to vastness of road scenarios and cooperation with other road users. Allowing autonomous vehicle to negotiate with other road users and act in an intelligent, complex manner in various road scenarios, may be provided using data driven approaches and artificial intelligence techniques, like Reinforcement Learning (RL), machine learning techniques (wherein Reinforcement Learning is a subfield for intelligent agent creation).

However, like all machine-learning techniques, Reinforcement Learning agents always learn only to some extent, raising concerns regarding safety, which is priority in safety-critical systems like Autonomous Driving (AD). One way of dealing with that issue may be to punish the agent for causing an accident or dangerous situations during the training phase. Although to assure safety on sensible level, differences in magnitudes between safety-related objectives and effectiveness, efficiency, and comfort-related objectives may yield an agent caring only about safety aspects.

Another approach is to embed a RL-based block in deterministic safety envelope, which may validate the RL-based block outputs and may suppress illegal and dangerous actions. This however may bring a lot of confusion to the RL-agent itself, because it may make it a lot harder to understand effects of its own action which is filtered by safety envelope. This may also slow down the training process. Furthermore, effects of own actions from the agent perspective are not clear anymore, as they are filtered out by safety envelope afterwards.

According to various embodiments, safety formalization framework (which may be referred to as Safety Framework) may be utilized (or combined) with a customized neural network architecture, allowing to predefine available actions which are legal and safe and then assuring that only those action may be picked by RL agent.

The safety framework may introduce a formalization of safety for autonomous driving application and may define a set of constrains determining safe way of driving, for example based on an AD system.

According to various embodiments, a behavioral and/or trajectory planning system may be provided which is responsible for defining a driving policy of an autonomous driving vehicle. The policy may include a control interface by which the behavior of the autonomous vehicle (for example car) may be changed.

According to various embodiments, the Safety Framework and a general common-sense rules may be used to define possible, legal, and safe action which may be marked as "available" to the RL-based planning block. Then, the neural network may produce a probability distribution only over available actions, for example using mechanisms as described herein for various embodiments, for example using a dot product of an output of a fully connected layer of a neural network and a mask which is determined based on a subset of potential maneuvers).

In an example, the RL-based planning block may be responsible for picking high-level semantic actions in form of a maneuver to execute. This block may be followed by one or more other blocks responsible for execution of such a maneuver.

In this example, a set of possible maneuvers may be defined as a list of three actions:
Follow Lane: the vehicle may be requested to follow its current lane while keeping safe distance to cars in front;
Lane Change Left: the vehicle may be requested to change lane to one on the left side; and
Lane Change Right: the vehicle may be requested to change lane to one on the right side.

Then, a mechanism of marking which maneuvers are currently available for execution may be provided. This mechanism may be based on one or more of the following considerations:
Machine state based: while performing a lane change maneuver to one side, in the next time instance, it may only be allowed to pick a lane change maneuver to the same side again or to abort the maneuver by switching to follow lane, while not allowing to jump straight to a lane change maneuver to other side (because this may lead to a zig-zag route).

Road based: if the lane on a given side is unavailable (for example because it does not exist or because there is a solid line between the lanes), lane change to this side may be marked as unavailable.

Object based: if other vehicles are present in the target lane, and according to the safety framework evaluation, lane change to this lane may not be performed in a safe manner, the lane change maneuver to this side may be marked as unavailable.

After deciding which maneuvers are available, this information may be used to define a probability distribution over only available actions.

Figure 1:
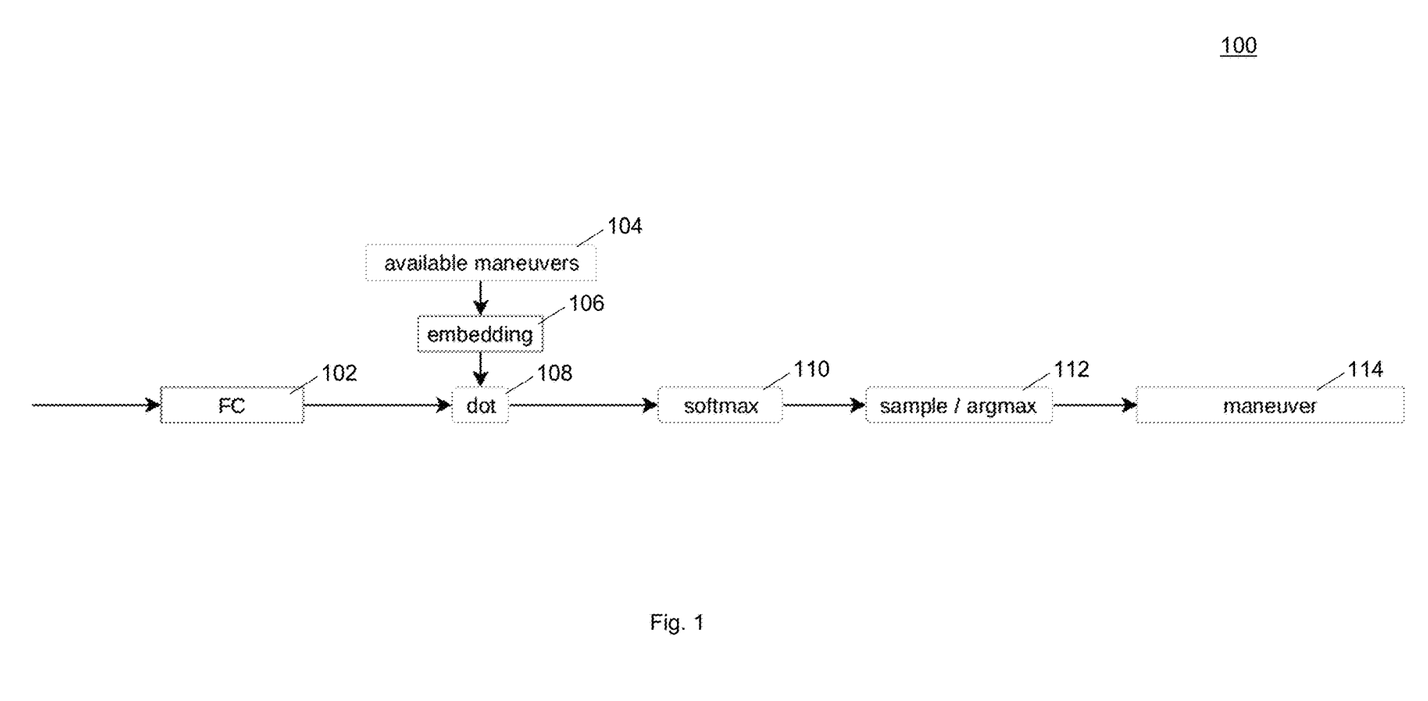
FIG. 1 an illustration of a methodology based on a neural network architecture for maneuver determination according to various embodiments.

FIG. 1 shows an illustration 100 of a methodology based on a neural network architecture for maneuver determination according to various embodiments. The methodology illustrated in FIG. 1 may provide an attention mechanism (which may be combined with a safety framework) which may be used to select a maneuver from available maneuvers list.

For example, a neural network may analyze a perception of a scene to generate a maneuver to execute. After prior processing, the agent at some stage of processing may have a basic understanding of what to do. The control head which may be responsible for maneuver selection is illustrated in FIG. 1. At input to this part, a general hidden state may represent the current desire of policy, followed by a fully connected (FC) layer 102, responsible for parsing the general desire to the desired maneuver strategy. Then, an available maneuvers mask may be used to pick related embeddings 106 (for example set of weights) based on the available maneuvers 104. Then a dot product 108, followed by a softmax activation function 110 may result in a probability distribution over only available actions. As a final step, by sampling from the resulting probability distribution or a picking action highest ranked maneuver may be determined, as illustrated by block 112, to obtain the maneuver 114 to be performed.

Following a similar approach, other control interfaces, after discretization, may be considered. Those interfaces may be used as a separate control schemes or in parallel to each other, creating general planning system. Some among others are:

Lane Bias: the RL-based planning block may decide on a desired lane bias in a lane, while understanding what kind of biasing is safe (for example due to assurance of minimal distance to other road users based on Safety Framework).

Distance to car in front: the RL-agent may decide on a distance to a car in front to keep, while the safety framework defines what is a minimal safe distance in the current circumstances and marks only distances greater than minimal one as available.

Velocity set point: the RL-agent may be responsible for picking desired speed, while the safety framework along with traffic sign recognition defines a maximum speed allowed and marks only speeds below defined threshold as available.

The processing flow within the neural network itself may stay unchanged, but the rules used for determining which lane bias, distance or velocity are available may be changed.

To determine what lane-biases are available, some small obstacles on a road may be analyzed, based on a maneuver (wherein for example lane biases in opposite direction to lane change may be forbidden) or based on other vehicles which may partially occupy our lane.

For velocity (in both absolute and additive way of providing it) determination may be based on actual speed limit, leading vehicle distance and speed and velocities of nearby car(s) while performing other maneuvers.

As described above, according to various embodiments, a safe reinforcement learning-based driving policy by deterministic action space predefinition may be provided.

Figure 2:
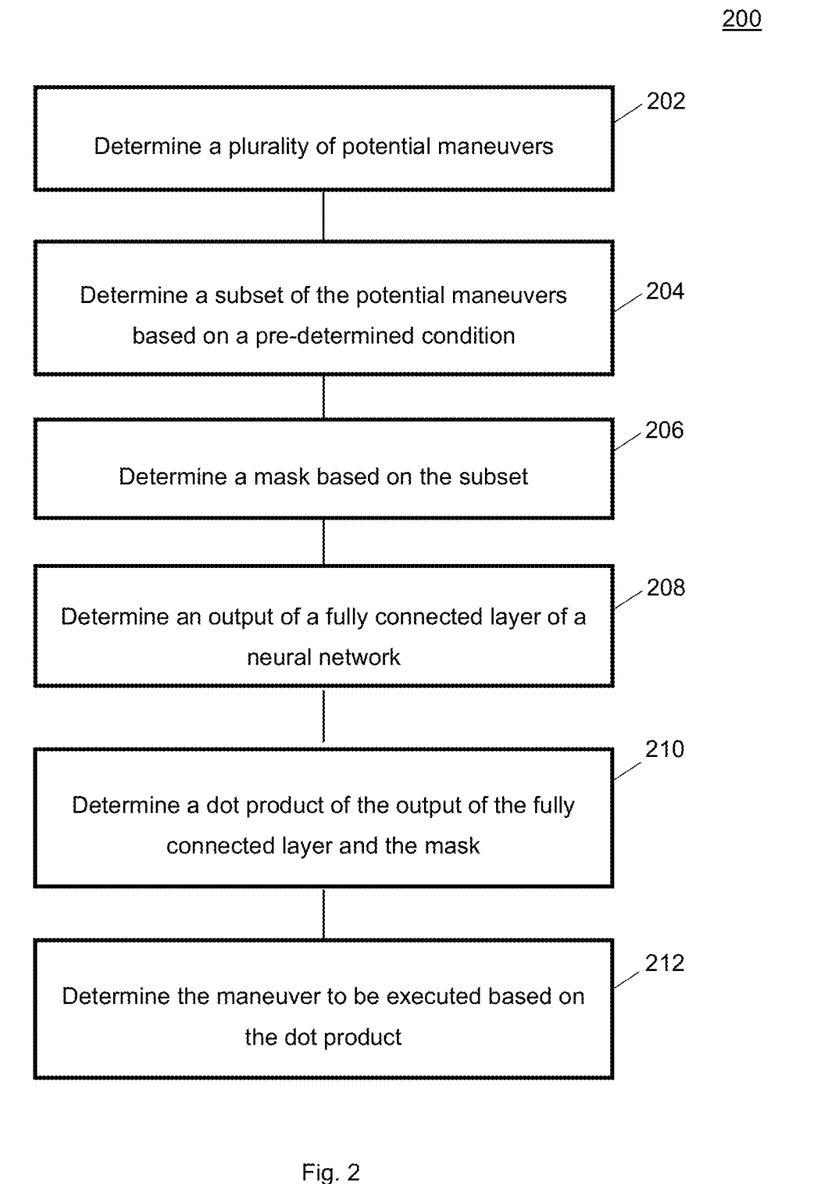
FIG. 2 a flow diagram illustrating a method for determining a maneuver to be executed by an autonomous vehicle according to various embodiments.

FIG. 2 shows a flow diagram 200 illustrating a method for determining a maneuver to be executed by an autonomous vehicle according to various embodiments. At 202, a plurality of potential maneuvers may be determined. At 204, a subset of the potential maneuvers may be determined based on a pre-determined condition. At 206, a mask may be determined based on the subset. At 206, an output of a fully connected layer of a neural network may be determined. At 208, a dot product of the output of the fully connected layer and the mask may be determined. At 210, the maneuver to be executed may be determined based on the dot product.

According to various embodiments, the pre-determined condition may include or may be at least one of lanes availability, legality of lane changes, objects appearance, or time constraints.

According to various embodiments, the mask may include a value of "1" for safe actions and a value of "0" for non-safe actions.

According to various embodiments, the dot product may be followed by a softmax activation function.

According to various embodiments, the softmax activation function may be followed by sampling.

According to various embodiments, the softmax activation function may be followed by an argmax function.

According to various embodiments, the neural network may be used in a reinforcement learning method.

According to various embodiments, the subset of the potential maneuvers may include or may be possible, safe, and legal maneuvers.

According to various embodiments, it may be determined whether a potential maneuvers is possible, safe, and legal based on at least one of available maneuvers, available distances, current speed, possible lane biases, and/or possible velocities.

According to various embodiments, the potential maneuvers may include or may be all maneuvers which the vehicle is able to perform.

According to various embodiments, at least one of a lane bias, a distance to another vehicle or a velocity set point may be determined for the potential maneuvers.

Each of the steps 202, 204, 206, 208, 210 and the further steps described above may be performed by computer hardware components.

Figure 3:
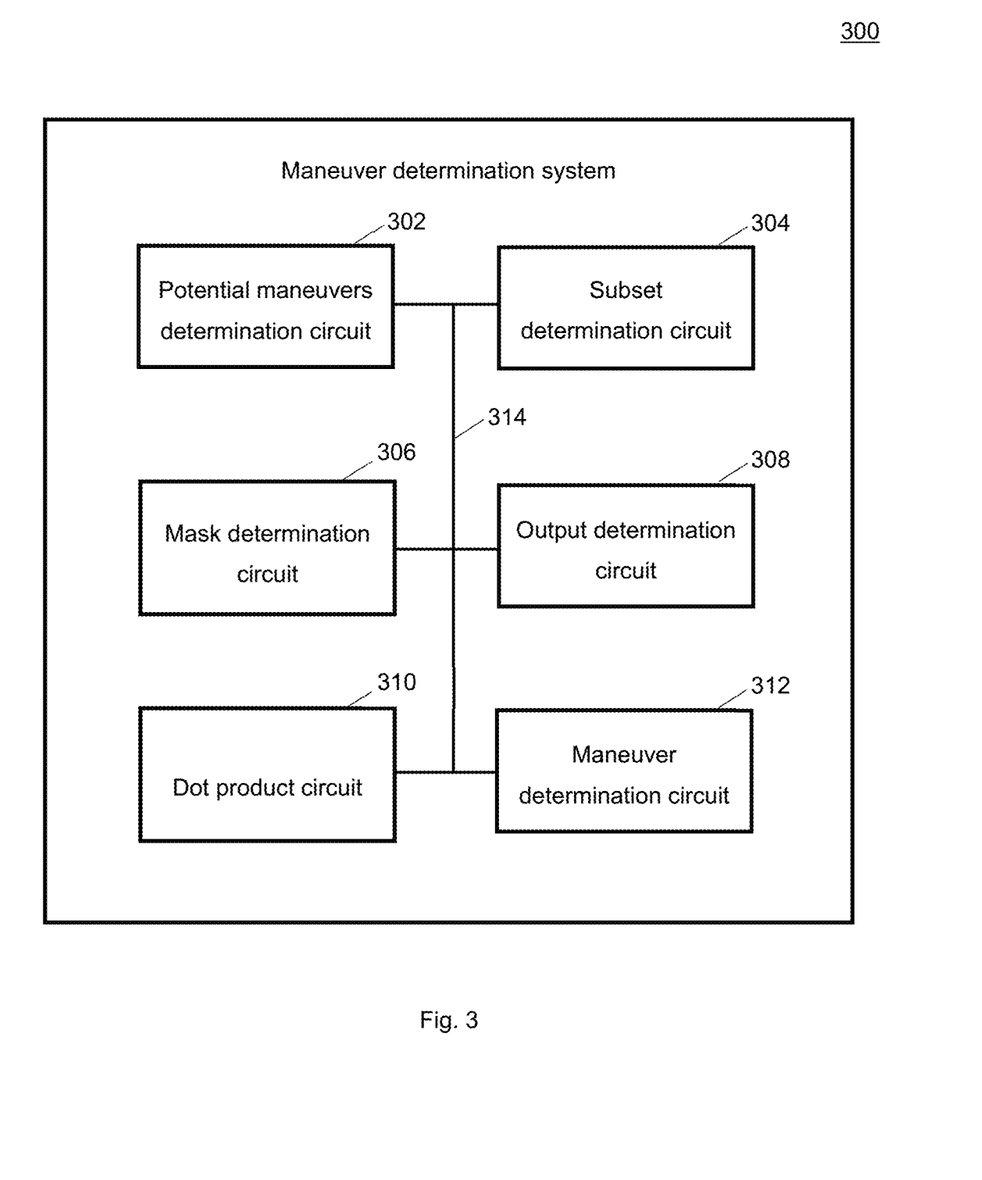
FIG. 3 a maneuver determination system according to various embodiments.

FIG. 3 shows a maneuver determination system 300 according to various embodiments. The maneuver determination system 300 may include a potential maneuvers determination circuit 302, a subset determination circuit 304, a mask determination circuit 306, an output determination circuit 308, a dot product circuit 310, and a maneuver determination circuit 312. The maneuver determination system 300 may be a system for determining a maneuver to be executed by an autonomous vehicle.

The potential maneuvers determination circuit 302 may be configured to determine a plurality of potential maneuvers.

The subset determination circuit 304 may be configured to determine a subset of the potential maneuvers based on a pre-determined condition.

The mask determination circuit 306 may be configured to determine a mask based on the subset.

The output determination circuit 308 may be configured to determine an output of a fully connected layer of a neural network.

The dot product circuit 310 may be configured to determine a dot product of the output of the fully connected layer and the mask.

The maneuver determination circuit 312 may be configured to determine the maneuver to be executed based on the dot product.

The potential maneuvers determination circuit 302, the subset determination circuit 304, the mask determination circuit 306, the output determination circuit 308, the dot product circuit 310, and the maneuver determination circuit 312 may be coupled with each other, e.g. via an electrical connection 314, such as e.g. a cable or a computer bus or via any other suitable electrical connection to exchange electrical signals.

A "circuit" may be understood as any kind of a logic implementing entity, which may be special purpose circuitry or a processor executing a program stored in a memory, firmware, or any combination thereof.

Figure 4:
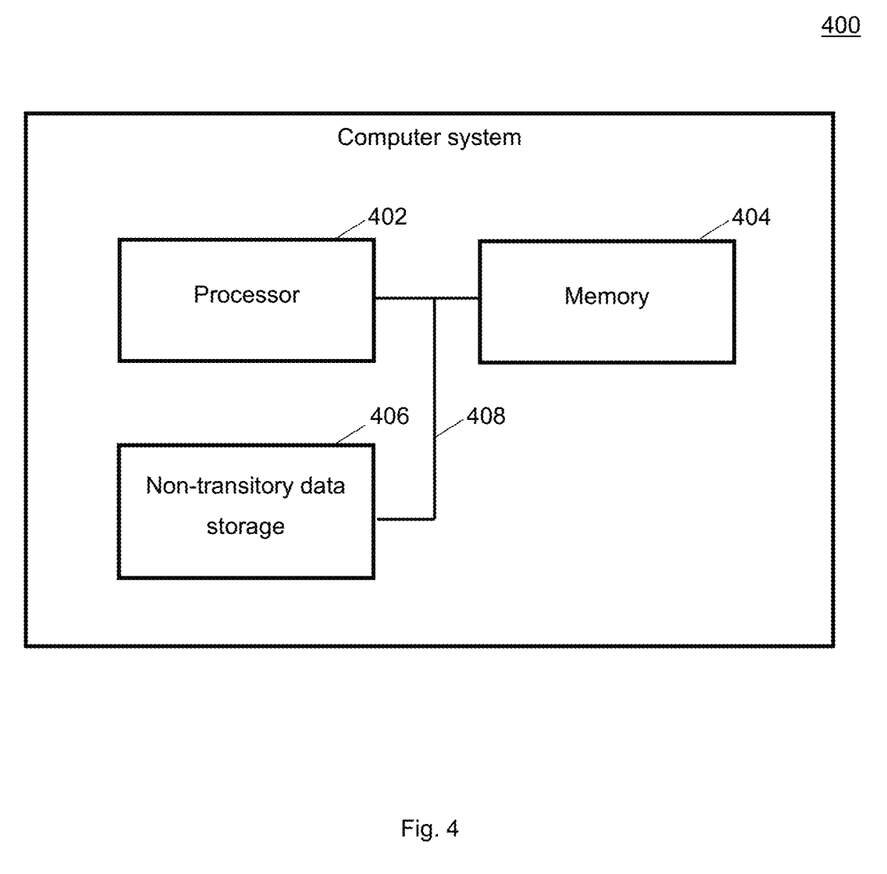
FIG. 4 a computer system with a plurality of computer hardware components configured to carry out steps of a computer implemented method for determining a maneuver to be executed by an autonomous vehicle according to various embodiments.

FIG. 4 shows a computer system 400 with a plurality of computer hardware components configured to carry out steps of a computer implemented method for determining a maneuver to be executed by an autonomous vehicle according to various embodiments. The computer system 400 may include a processor 402, a memory 404, and a non-transitory data storage 406.

The processor 402 may carry out instructions provided in the memory 404. The non-transitory data storage 406 may store a computer program, including the instructions that may be transferred to the memory 404 and then executed by the processor 402.

The processor 402, the memory 404, and the non-transitory data storage 406 may be coupled with each other, e.g. via an electrical connection 408, such as e.g. a cable or a computer bus or via any other suitable electrical connection to exchange electrical signals.

The terms "coupling" or "connection" are intended to include a direct "coupling" (for example via a physical link) or direct "connection" as well as an indirect "coupling" or indirect "connection" (for example via a logical link), respectively.

It will be understood that what has been described for one of the methods above may analogously hold true for the maneuver determination system 300 and/or for the computer system 400.

What is claimed is:

1. A computer-implemented method comprising:
   determining, by computer hardware components of a vehicle, a plurality of potential maneuvers for a vehicle;
   determining, by computer hardware components, a subset of the potential maneuvers based on pre-determined conditions,
   wherein the pre-determined conditions include: lane availability of one or more lanes, legality of one or more lane changes, one or more object appearances, and one or more time constrains;
   determining, by computer hardware components, a mask based on the subset of the potential maneuvers;
   determining, by computer hardware components, an output of a fully connected layer of a neural network;
   determining, by computer hardware components, a dot product of the output of the fully connected layer and the mask;
   applying, by computer hardware components, a softmax activation function to a result of the dot product thereby producing a probability distribution over available maneuvers; and
   determining, by computer hardware components, a maneuver to be executed by the vehicle by sampling from the probability distribution.

2. The computer-implemented method of claim 1, wherein the mask comprises a first value for first actions of a first level of safety and a second value for second actions of a second level of safety, wherein the second level of safety is less than the first level of safety.

3. The computer-implemented method of claim 1, further comprising applying at least one of: a sampling or an argmax function based on the applied softmax activation function, wherein the determining the maneuver to be executed is based further on an output of the applied sampling or argmax function.

4. The computer-implemented method of claim 1, further comprising using the neural network in a reinforcement learning method.

5. The computer-implemented method of claim 1, wherein the subset of the potential maneuvers are possible, a level of safety, and legal maneuvers.

6. The computer-implemented method of claim 5, wherein the subset of the potential maneuvers are possible, a level of safety, and legal based on at least one of: one or more available maneuvers, one or more available distances, a current speed, one or more possible lane biases, or one or more possible velocities.

7. The computer-implemented method of claim 1, wherein the potential maneuvers comprise all maneuvers that the vehicle is able to perform.

8. The computer-implemented method of claim 1, further comprising determining, for each of the potential maneuvers, at least one of: a lane bias, a distance to another vehicle, or a velocity set point.

9. A system configured to be disposed in a vehicle, the system comprising:
   at least one processor configured to:
      determine a plurality of potential maneuvers for the vehicle;
      determine a subset of the potential maneuvers based on pre-determined conditions,
      wherein the pre-determined conditions include: lane availability of one or more lanes, legality of one or more lane changes, one or more object appearances, and one or more time constrains;
      determine a mask based on the subset of the potential maneuvers;
      determine an output of a fully connected layer of a neural network;
      determine a dot product of the output of the fully connected layer and the mask;
      apply a softmax activation function to a result of the dot product thereby producing a probability distribution over available maneuvers; and
      determine a maneuver to be executed by the vehicle based on the dot product.

10. The system of claim 9, further comprising at least one sensor, wherein the determination of the subset of the potential maneuvers is based further on an output of the sensor.

11. The system of claim 9, wherein the determination of the subset of the potential maneuvers is based further on a map of a vicinity of the vehicle.

12. The system of claim 9, wherein the mask comprises one for first maneuvers of the subset of the potential maneuvers of a first level of safety and the mask comprises zero for second maneuvers of the subset of the potential maneuvers of a second level of safety, wherein the second level of safety is less than the first level of safety.

13. The system of claim 9, wherein the processor is further configured to apply at least one of: a sampling function or an argmax function based on the output of the applied softmax activation function, wherein the determination of the maneuver to be executed is based further on an output of the applied sampling function or argmax function.

14. The system of claim 9, wherein:
the processor is further configured to determine which of the potential maneuvers are possible, a level of safety, and legal; and
the subset of the potential maneuvers contains potential maneuvers that are possible, a level of safety, and legal.

15. The system of claim 14, wherein the potential maneuvers are determined to be possible, a level of safety, and legal based on at least one of: one or more available maneuvers, one or more available distances, a current speed, one or more possible lane biases, or one or more possible velocities.

16. A non-transitory computer-readable storage media comprising instructions that, when executed by at least one processor of a system for a vehicle, cause the processor to:
determine a plurality of potential maneuvers for the vehicle;
determine a subset of the potential maneuvers based on pre-determined conditions,
wherein the pre-determined conditions include: lane availability of one or more lanes, legality of one or more lane changes, one or more object appearances, and one or more time constrains;
determine a mask based on the subset of the potential maneuvers;
determine an output of a fully connected layer of a neural network;
determine a dot product of the output of the fully connected layer and the mask;
apply a softmax activation function to a result of the dot product thereby producing a probability distribution over available maneuvers; and
determine a maneuver to be executed by the vehicle by sampling from the probability distribution.

* * * * *